United States Patent
Paetow et al.

(10) Patent No.: US 11,585,466 B2
(45) Date of Patent: *Feb. 21, 2023

(54) DEVICE FOR PASSING PIPES OR CABLES THROUGH AN OPENING IN A BUILDING

(71) Applicant: Hilti Aktiengesellschaft, Schaan (LI)

(72) Inventors: Mario Paetow, Igling (DE); Christian Förg, Lamerdingen (DE); Rudolf Semler, Prittriching (DE); Thomas Monden, Stetten (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,082

(22) Filed: Jan. 4, 2022

(65) Prior Publication Data

US 2022/0120361 A1 Apr. 21, 2022

Related U.S. Application Data

(63) Continuation of application No. 16/855,049, filed on Apr. 22, 2020, now Pat. No. 11,242,946, which is a (Continued)

(30) Foreign Application Priority Data

Dec. 9, 2013 (EP) ..................................... 13196170

(51) Int. Cl.
*F16L 5/04* (2006.01)
*H02G 3/22* (2006.01)

(52) U.S. Cl.
CPC .................. *F16L 5/04* (2013.01); *H02G 3/22* (2013.01)

(58) Field of Classification Search
CPC ..... F16L 5/00; F16L 5/04; H02G 3/22; H02G 3/185; Y10T 16/05
(Continued)

(56) References Cited

U.S. PATENT DOCUMENTS 3,143,208 A 8/1964 Sizemore, Jr.
4,361,922 A 12/1982 Karal
(Continued)

FOREIGN PATENT DOCUMENTS

AU 30326/95 3/1996
CA 2 787 642 3/2013
(Continued)

OTHER PUBLICATIONS

International Search Report dated Feb. 3, 2015 in PCT/EP2014/076168, 8 pgs.
(Continued)

*Primary Examiner* — Patrick F Brinson
(74) *Attorney, Agent, or Firm* — Grüneberg and Myers, PLLC

(57) ABSTRACT

The invention relates to a device for passing pipes or cables through an opening in a building. Said device comprises a sleeve-like housing that has an axial passage channel that is open at its opposite ends; bristles that are mounted on the walls of the passage channel in such a way that they are opposite each other and that are extended inwards in such a way that they mesh with one another in order to close the passage channel; and flexible strips of material that are mounted in the passage channel and that are coated with an intumescent material.

13 Claims, 2 Drawing Sheets

Related U.S. Application Data continuation of application No. 16/382,475, filed on Apr. 12, 2019, now Pat. No. 10,663,090, which is a continuation of application No. 15/924,160, filed on Mar. 16, 2018, now Pat. No. 10,295,088, which is a continuation of application No. 15/171,593, filed on Jun. 2, 2016, now Pat. No. 9,982,805, which is a continuation of application No. PCT/EP2014/076168, filed on Dec. 2, 2014.

(58) Field of Classification Search
USPC .... 138/106, 103, 109; 174/659, 660, 153 G, 174/152 G; 15/DIG. 6, DIG. 5
See application file for complete search history.

(56) References Cited

U.S. PATENT DOCUMENTS

| | | | |
|---|---|---|---|
| 4,460,804 | A | 7/1984 | Svejkovsky |
| 4,538,389 | A | 9/1985 | Heinen |
| 4,649,089 | A | 3/1987 | Thwaites |
| 5,058,341 | A | 10/1991 | Harbeke, Jr. |
| 5,347,767 | A | 9/1994 | Roth |
| 5,351,448 | A | 10/1994 | Gohlke et al. |
| 5,390,458 | A | 2/1995 | Menchetti |
| 5,452,551 | A | 9/1995 | Charland et al. |
| 5,456,050 | A | 10/1995 | Ward |
| 5,765,318 | A | 6/1998 | Michelson |
| 6,125,608 | A | 10/2000 | Charlson |
| 6,167,915 | B1 | 1/2001 | Collie et al. |
| 6,172,052 | B1 | 1/2001 | Cook et al. |
| 6,176,052 | B1 | 1/2001 | Takahashi |
| 6,360,502 | B1 | 3/2002 | Stahl, Jr. |
| 6,426,463 | B2 | 7/2002 | Münzenberger et al. |
| 6,632,999 | B2 | 10/2003 | Sempliner et al. |
| 6,725,615 | B1 | 4/2004 | Porter |
| 6,732,481 | B2 | 5/2004 | Stahl, Sr. |
| D502,147 | S | 2/2005 | Stahl, Sr. |
| 6,928,777 | B2 | 8/2005 | Cordts |
| 6,935,080 | B2 | 8/2005 | Allwein et al. |
| 7,240,905 | B1 | 7/2007 | Stahl, Sr. |
| 7,373,761 | B2 | 5/2008 | Stahl, Sr. |
| 7,427,050 | B2 | 9/2008 | Stahl, Sr. et al. |
| 7,478,503 | B2 | 1/2009 | Milani et al. |
| 7,523,590 | B2 | 4/2009 | Stahl, Sr. |
| 7,560,644 | B2 | 7/2009 | Ford et al. |
| 7,596,914 | B2 | 10/2009 | Stahl, Sr. et al. |
| 7,685,792 | B2 | 3/2010 | Stahl, Sr. et al. |
| 7,694,474 | B1 | 4/2010 | Stahl, Sr. et al. |
| 7,797,893 | B2 | 9/2010 | Stahl, Sr. et al. |
| 7,856,775 | B2 | 12/2010 | Stahl, Jr. |
| 7,867,591 | B2 | 1/2011 | Sieber et al. |
| 7,987,872 | B2 | 8/2011 | Bouhaj |
| 8,051,614 | B1 | 11/2011 | Peck et al. |
| D657,232 | S | 4/2012 | Stahl, Sr. et al. |
| 8,188,382 | B2 | 5/2012 | Monden et al. |
| 8,266,854 | B2 | 9/2012 | Reddicliffe |
| 8,375,666 | B2 | 2/2013 | Stahl, Jr. et al. |
| 8,397,452 | B2 | 3/2013 | Stahl, Sr. et al. |
| 8,419,876 | B1 | 4/2013 | Harris |
| 8,584,415 | B2 | 11/2013 | Stahl, Jr. et al. |
| 8,590,231 | B2 | 11/2013 | Pilz |
| 8,671,632 | B2 | 3/2014 | Pilz et al. |
| 8,672,275 | B2 | 3/2014 | Van Walraven et al. |
| 8,793,946 | B2 | 8/2014 | Stahl, Jr. et al. |
| 8,833,478 | B2 | 9/2014 | Zernach et al. |
| 8,869,475 | B2 | 10/2014 | Lopes |
| 8,887,458 | B2 | 11/2014 | Lopes |
| 8,910,949 | B2 | 12/2014 | ÅKesson |
| 8,955,275 | B2 | 2/2015 | Stahl, Jr. |
| 9,046,194 | B2 | 6/2015 | Gandolfo et al. |
| 9,157,232 | B2 | 10/2015 | Stahl, Jr. |
| 9,162,093 | B2 | 10/2015 | Foerg et al. |
| 9,246,315 | B2 | 1/2016 | Boyd |
| 10,143,868 | B2* | 12/2018 | Lopes ..................... A62C 3/16 |
| 10,295,088 | B2* | 5/2019 | Paetow ..................... F16L 5/04 |
| 10,641,417 | B2* | 5/2020 | Muenzenberger ........ F16L 5/04 |
| 2005/0133242 | A1 | 6/2005 | Kreutz |
| 2006/0037264 | A1 | 2/2006 | Paetow et al. |
| 2006/0138251 | A1 | 6/2006 | Stahl, Sr. |
| 2007/0125018 | A1 | 6/2007 | Stahl, Sr. |
| 2007/0151183 | A1 | 7/2007 | Stahl, Sr. et al. |
| 2007/0175125 | A1 | 8/2007 | Stahl, Sr. et al. |
| 2007/0204540 | A1 | 9/2007 | Stahl, Sr. et al. |
| 2007/0261339 | A1 | 11/2007 | Stahl, Sr. et al. |
| 2007/0261343 | A1 | 11/2007 | Stahl, Sr. et al. |
| 2009/0126297 | A1 | 5/2009 | Stahl, Jr. |
| 2009/0151983 | A1 | 6/2009 | Sempliner et al. |
| 2009/0218130 | A1* | 9/2009 | Monden ..................... F16L 5/04 |
| | | | 174/505 |
| 2011/0011019 | A1 | 1/2011 | Stahl, Jr. et al. |
| 2011/0088342 | A1 | 4/2011 | Stahl, Sr. et al. |
| 2011/0094759 | A1 | 4/2011 | Lopes |
| 2012/0304979 | A1 | 12/2012 | Munzenberger et al. |
| 2013/0061544 | A1 | 3/2013 | Stahl, Jr. et al. |
| 2013/0091790 | A1 | 4/2013 | Stahl, Jr. et al. |
| 2013/0097948 | A1 | 4/2013 | Burgess |
| 2013/0205694 | A1 | 8/2013 | Stahl, Jr. |
| 2013/0277918 | A1 | 10/2013 | Fitzgerald et al. |
| 2013/0307225 | A1 | 11/2013 | Boyd |
| 2014/0020915 | A1 | 1/2014 | Lopes |
| 2014/0077043 | A1 | 3/2014 | Foerg |
| 2014/0137494 | A1 | 5/2014 | Stahl, Jr. et al. |
| 2014/0360115 | A1 | 12/2014 | Stahl, Jr. |
| 2015/0007515 | A1 | 1/2015 | Stahl, Jr. |
| 2015/0047276 | A1 | 2/2015 | Gandolfo et al. |
| 2015/0135622 | A1 | 5/2015 | Muenzenberger et al. |
| 2016/0244612 | A1 | 8/2016 | Unohara et al. |
| 2018/0259095 | A1* | 9/2018 | Schulz-Hanke ........ F16L 5/025 |
| 2019/0305539 | A1* | 10/2019 | Schulz-Hanke, Sr. ... H02G 3/22 |

FOREIGN PATENT DOCUMENTS

| | | |
|---|---|---|
| CA | 2 841 523 | 9/2014 |
| CA | 2 849 597 | 12/2014 |
| DE | 216225 | 11/1909 |
| DE | 94 11 293 U1 | 9/1994 |
| DE | 100 43 430 | 3/2002 |
| DE | 20 2006 019 593 U1 | 4/2007 |
| DE | 10 2011 105 575 | 9/2012 |
| DE | 20 2013 103 170 U1 | 9/2013 |
| EP | 0 869 303 | 10/1998 |
| EP | 0 988 873 | 3/2000 |
| ES | 2 312 276 | 2/2009 |
| GB | 2 216 220 | 10/1989 |
| GB | 2 233 725 | 1/1991 |
| GB | 2 318 975 | 5/1998 |
| GB | 2 457 152 | 9/2009 |
| JP | 2000-240854 | 9/2000 |
| JP | 2014-148998 | 8/2014 |
| JP | 2015-057560 | 3/2015 |
| WO | 2002/037011 | 5/2002 |
| WO | 2004/015319 | 2/2004 |
| WO | 2007/061572 | 5/2007 |
| WO | 2013/160776 | 10/2013 |
| WO | 2014/071362 | 5/2014 |
| WO | 2014/081446 | 5/2014 |
| WO | 2015/023313 | 2/2015 |

OTHER PUBLICATIONS

"Intumex CSP-Fire Stopping coating", Apr. 3, 2012, XP055105024, Internet URL: http://www.intumex-fs.com/pdf/datasheet/Intumex%20CSP-DS%20[EN].pdf [found on Mar. 6, 2014] the whole document. 1 pg.

Document 1, filed Sep. 22, 2022, "Complaint For Patent Infringement" in Case 1:22-cv-01248-CFC (in the U.S. District Court for the District of Delaware).

Exhibit 1 to Document 1, filed Sep. 22, 2022, "Complaint for Parent Infringement" in Case 1:22-cv-01248-CFC (in the U.S. District Court for the District of Delaware).

(56) References Cited

OTHER PUBLICATIONS

Exhibit 2 to Document 1, filed Sep. 22, 2022, "Complaint for Patent Infringement" in Case 1:22-cv-01248-CFC (in the U.S. District Court for the District of Delaware).
Exhibit 3 to Document 1, filed Sep. 22, 2022, "Complaint for Patent Infringe" in Case 1:22-cv-01248-CFC (in the U.S. District Court for the District of Delaware).
Exhibit 4 to Document 1, filed Sep. 22, 2022, "Complaint for Patent Infringement" in Case 1:22-cv-01248-CFC (in the U.S. District Court for the District of Delaware).
Exhibit 5 to Document 1, filed Sep. 22, 2022, "Complaint for Patent Infringement" in Case 1:22-cv-01248-CFC (in the U.S. District Court for the District of Delaware).
Exhibit 6 to Document 1, filed Sep. 22, 2022, "Complaint for Patent Infringement" in Case 1:22-cv-01248-CFC (in the U.S. District Court for the District of Delaware).
Exhibit 7 to Document 1, filed Sep. 22, 2022, "Complaint for Patent Infringement" in Case 1:22-cv-01248-CFFC (in the U.S. District Court for the District of Delaware).
Exhibit 8 to Document 1, filed Sep. 22, 2022, "Complaint for Patent Infringement" in Case 1:22-cv-01248-CFC (in the U.S. District Court for the District Delaware).
Exhibit 9 to Document 1, filed Sep. 22, 2022, "Complaint for Patent Infringement" in Case 1:22-cv-01248-CFC (in the U.S. District Court for the District of Delaware).
Exhibit 10 to Document 1, filed Sep. 22, 2022, "Complaint for Patent Infringement" in Case 1:22-cv-01248-CFC (in the U.S. District Court for the District of Delaware).
Exhibit 11 to Document 1, filed Sep. 22, 2022, "Complaint for Patent Infringement" in Case 1:22-cv-01248-CFC (in the U.S. District Court for the District of Delaware).
Exhibit 12 to Document 1, filed Sep. 22, 2022, "Complaint for Patent Infringement" in Case 1:22-cv-01248-CFC (in the U.S. District Court for the District of Delaware).
Exhibit 13 to Document 1, filed Sep. 22, 2022, "Complaint for Patent Infringement" in Case 1:22-cv-01248-CFC (in the U.S. District Court for the District of Delaware).
Exhibit 14 to Document 1, filed Sep. 22, 2022, "Complaint for Patent Infringement" in Case 1:22-cv-01248-CFC (in the U.S. District Court for the District of Delaware).
Exhibit 15 to Document 1, filed Sep. 22, 2022, "Complaint for Patent Infringement" in Case 1:22-cv-01248-CFC (in the U.S. District Court for the District of Delaware).
Exhibit 16 to Document 1, filed Sep. 22, 2022, "Complaint for Patent Infringement" in Case 1:22-cv-01248-CFC (in the U.S. District Court for the District of Delaware).
Exhibit 17 to Document 1, filed Sep. 22, 2022, "Complaint for Patent Infringement" in Case 1:22-cv-01248-CFC (in the U.S. District Court for the District of Delaware).
Exhibit 18 to Document 1, filed Sep. 22, 2022, "Complaint for Patent Infringement" in Case 1:22-cv-01248-CFC (in the U.S. District Court for the District of Delaware).
Exhibit 19 to Document 1, filed Sep. 22, 2022, "Complaint for Patent Infringement" in Case 1:22-cv-01248-CFC (in the U.S. District Court for the District of Delaware).
Exhibit 20 to Document 1, filed Sep. 22, 2022, "Complaint for Patent Infringement" in Case 1:22-cv-01248-CFC (in the U.S. District Court for the District of Delaware).
Exhibit 21 to Document 1, filed Sep. 22, 2022, "Complaint for Patent Infringement" in Case 1:22-cv-01248-CFCC (in the U.S. District Court for the District of Delaware).
Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 1 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 2 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 3 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 4 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 5 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 6 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 7 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 8 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 9 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 10 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 11 to Document 13, filed Nov. 21, 2022, "Specified Technologies, Inc.'s Answer to Complaint for Patent Infringe, Defenses and Counterclaims" in Case 1:22-cv-01248-CFC (in the U.S. District Court for the District of Delaware).
Exhibit 12 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 13 to Document 13, filed Nov. 21, 2022, "Specified Technologies, Inc.'s Answer to Complaint for Patent Infringement, Defenses and Countercliams" in Case 1:22-cv-01248-CFC (in the U.S. District Court for the District of Delaware).
Exhibit 14 to Document 13, filed Nov. 21, 2022, "Specified Technologies, Inc.'s Answer to Complaint for Patent Infringement, Defenses and Counterclaims" in Case 1:22-cv-01248-CFC (in the U.S. District for the District of Delaware).
Exhibit 15 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 16 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 17 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 18 to Document 13, filed Nov. 21, 2022, "Specified Technologies, Inc.'s Answer to Complaint for Patent Infringement, Defenses and Counterclaims" in Case 1:22-cv-01248-CFC (in the U.S. District court for the District of Delaware).
Exhibit 19 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).

(56) References Cited

OTHER PUBLICATIONS

Exhibit 20 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 21 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 22 to Document 13, filed Nov. 21, 2022, "Specified Technologies, Inc.'s Asnwer to Complaint for Patent Infringement, Defenses and Counterclaims" in Case 1:22-cv-01248-CFC (in the U.S. District Court for the District of Delaware).
Exhibit 23 to Document 13, filed Nov. 21, 2022, "Specified Technologies, Inc.'s Answer to Complaint for Patent Infringemnet, Defenses and Counterclaims" in Case 1:22-cv-01248-CFC (in the U.S. District Court for the District of Delaware).
Exhibit 24 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 25 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 26 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 27 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 28 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 29 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 30 to Document 13, filed Nov. 21, 2022, "Specified Technologies, Inc.'s Answer to Complaint for Patent Infringement, Defense and Counterclaims" in Case 1:22-cv-01248-CFC (in the U.S. District Court for the District of Delaware).
Exhibit 31 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 32 to Document 13, filed Nov. 21, 2022, "Specified Technologies, Inc.'s Answer to Complaint for Patent Infringement, Defenses and Counterclaims" in Case 1:22-cv-01248-CFC (in the U.S. District for the District of Delaware).
Exhibit 33 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 34 to Document 13, filed Nov. 21, 2022, "Specified Technologies, Inc.'s Answer to COmplaint for Patent Infringement, Defenses and Counterclaims" in Case 1:22-cv-01248-CFC (in the U.S. District Court for the District of Delaware).
Exhibit 35 to Document 13, field Nov. 21, 2022, "Specified Technologies, Inc.'s Answer to Complaint for Patent Infringement, Defenses and Counterclaims" in Case 1:22-cv-01248-CFC (in the U.S. District for the District of Delaware).
Exhibit 36 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 37 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 38 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 39 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 40 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 41 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 42 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 43 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 44 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).
Exhibit 45 to Document 13, filed Nov. 21, 2022, "Specified Technologies, Inc.'s Answer to Complaint for Patent Infringement, Defenses and Counterclaims" in Case 1:22-cv-01248-CFC (in the U.S. District Court for the District of Delaware).

* cited by examiner

DEVICE FOR PASSING PIPES OR CABLES THROUGH AN OPENING IN A BUILDING

CROSS-REFERENCE TO RELATED APPLICATIONS

This application is a Continuation of U.S. patent application Ser. No. 16/855,049, filed on Apr. 22, 2020, which is a Continuation of U.S. patent application Ser. No. 16/382,475, filed on Apr. 12, 2019, which is a Continuation of U.S. patent application Ser. No. 15/924,160, filed Mar. 16, 2018, which is a Continuation of U.S. patent application Ser. No. 15/171,593 filed Jun. 2, 2016, which is a Continuation of International Application No. PCT/EP2014/076168, filed on Dec. 2, 2014, and which claims the benefit of European Application No. 13196170.8, filed on Dec. 9, 2013, the contents of which are incorporated by reference herein in their entireties.

SUMMARY

The present invention relates to a device for passing pipes or cables through an opening in a building, such as, for example, a break-through in a ceiling or wall.

A cable or a pipe that is passed through walls and ceilings has to be sufficiently protected to prevent the spread of a fire. On the one hand, the objective is to prevent a fire from leaping directly through the opening to an adjacent space. On the other hand, the objective is to ensure that the spaces are thermally separated from each other, in order to prevent the temperature on the side of the relevant wall or ceiling that faces away from the fire from rising so high that that it is possible for said wall or ceiling to auto-ignite, i.e., initiate combustion by heat, but without a flame. Therefore, it is necessary to satisfy specific statutory approvals with respect to the fire protection properties.

The objective that is to be fulfilled is that the installation of cables or pipes should be simple and easy and should not be hampered by fire protection measures. To date, box-shaped housings, which form a passage channel for the lines to be installed, have been inserted into the openings for this purpose. The housing is cast into the corresponding ceiling or wall. After the pipes or cables have been passed through, the interior of the housing is filled with a fireproof sealing compound or stuffed with mineral wool and then sealed with a fireproof sealing compound that encloses the lines.

However, this solution for achieving fire protection has a number of drawbacks. The curing time of the sealing compounds is long, and the manual effort and amount of time required for installation is comparatively high. Openings that are difficult to access are hared to close. In addition, this solution does not lend itself to all applications. One example of such an application would be pre-assembled air conditioning units such as those used, for example, in larger apartment buildings. The feed lines of such a unit protrude from the base of the unit. Such a pre-assembled air conditioning unit is easy to install because the lines are inserted into a break-through in the base of the unit. Then the unit is placed on said opening so that the entire unit sits on the opening in the base and partially or completely covers said opening. It goes without saying that, for the purpose of casting the lines, which have been passed through, with a sealing compound, the housing, as described above, does not lend itself to this application because the opening in the base is no longer accessible after the unit has bean set up.

Therefore, the object of the present invention is to provide a device for passing pipes or cables through an opening in a building in such a way that said device is easy to install and ensures that, on the one hand, the pipes or cables can be flexibly positioned inside the opening, but, on the other hand, said device reliably prevents a fire from spreading and sufficiently insulates the mutually adjacent spaces, which are connected by means of the opening, from each other against heat.

This engineering object is achieved by means of a device exhibiting the features disclosed in patent claim 1.

The inventive device for passing pipes or cables through an opening in a building comprises a sleeve-like housing, which has an axial passage channel that is open at its opposite ends. This housing can be cast into the relevant ceiling or wall so that the passage channel for passing said pipes or cables, which are to be installed, remains free. Mounted on the walls of the passage channel are brushes that extend into the channel and, in particular, in such a way that their bristles mesh with one another in order to close the passage channel. In addition, flexible strips of material are mounted in the passage channel, and these flexible strips of material are coated with an intumescent material, i.e., a material that expands when exposed to heat and forms a fireproof, rigid body.

The brushes are used as a convection barrier for the fames from a fire and visually seal off the passage channel so that the opening in a building appears opaque. Upon insertion of a pipe or cable, the bristles deflect laterally and nestle around the pipes or cables so that the sealing effect is largely maintained. It is possible to select the flexibility or rather the stiffness of the bristles to match this purpose. The bristles may be made of inorganic or organic fibers that are fireproof and exhibit high stability under heat.

In the event of a fire the passage channel is closed by the intumescent material that is applied to the flexible strip. In the ideal case, the intumescent material expands and completely closes the passage channel.

With respect to the selection of the base material for the strips, there are no fundamental restrictions. It is expedient for this purpose to select a material that has a specific degree of thermostability. For example, the strips may be made from a suitable woven fabric.

The inventive arrangement of the brushes and the flexible strips offers the advantage that the free positioning of the pipes or cables inside the opening in a building is not impeded. As a result, the installation becomes much simpler, yet a fireproof closure is achieved in a reliable fashion. Furthermore, the brushes can act as a base for a sealing compound, in particular, a self-levelling sealing compound such as, for example, a self-levelling silicone sealant, which seals off the opening so that water cannot enter when waterproofing and/or gas-tightness is required.

The device of the invention offers the additional advantage that a specific degree of fire protection is ensured as early as just after the shell of the building with the finished interlocking ceilings and walls has been constructed. Then additional insulating measures, such as, for example, a mineral wool insulation, are superfluous.

According to a preferred embodiment of the present invention, the flexible strips of material protrude inwards from the walls of the passage channel in a manner similar to the brushes, and, at the same time, the strips may sag slightly downwards due to their intrinsic weight.

According to another preferred embodiment of the present invention, the base material of the flexible strips is a woven fabric, in particular, a woven glass fiber fabric. The glass fibers act as an internal reinforcement and reliably hold the foamed intumescent material of the coating in the passage channel.

According to an additional preferred embodiment, the passage channel has an approximately rectangular cross section, where in this case a brush is mounted on each of the two parallel flat walls that are opposite each other. The rows of bristles of these brushes protrude into the passage channel and face each other so that they mesh with each other at their ends and close the channel.

Preferably, the brushes are arranged on an upper end of the passage channel in the installation position, while the flexible strips are arranged so as to be staggered underneath said brushes. In this case, the brushes provide for a seal that looks opaque and for a convection barrier at the upper end of the channel, while the flexible strips of material that are located underneath can freely protrude into the channel.

According to another preferred embodiment of the invention, the housing is provided with a radially outwards extending flange on at least one of its axial ends. When the housing is installed, this flange terminates flush with the surface of the ceiling or the wall that is adjacent to the opening; or this flange rests on the surface of the ceiling or the wall that is adjacent to the opening so that the installation is easier.

A preferred exemplary embodiment of the present invention is explained in greater detail below with reference to the drawings.

DETAILED DESCRIPTION

Figure 1:
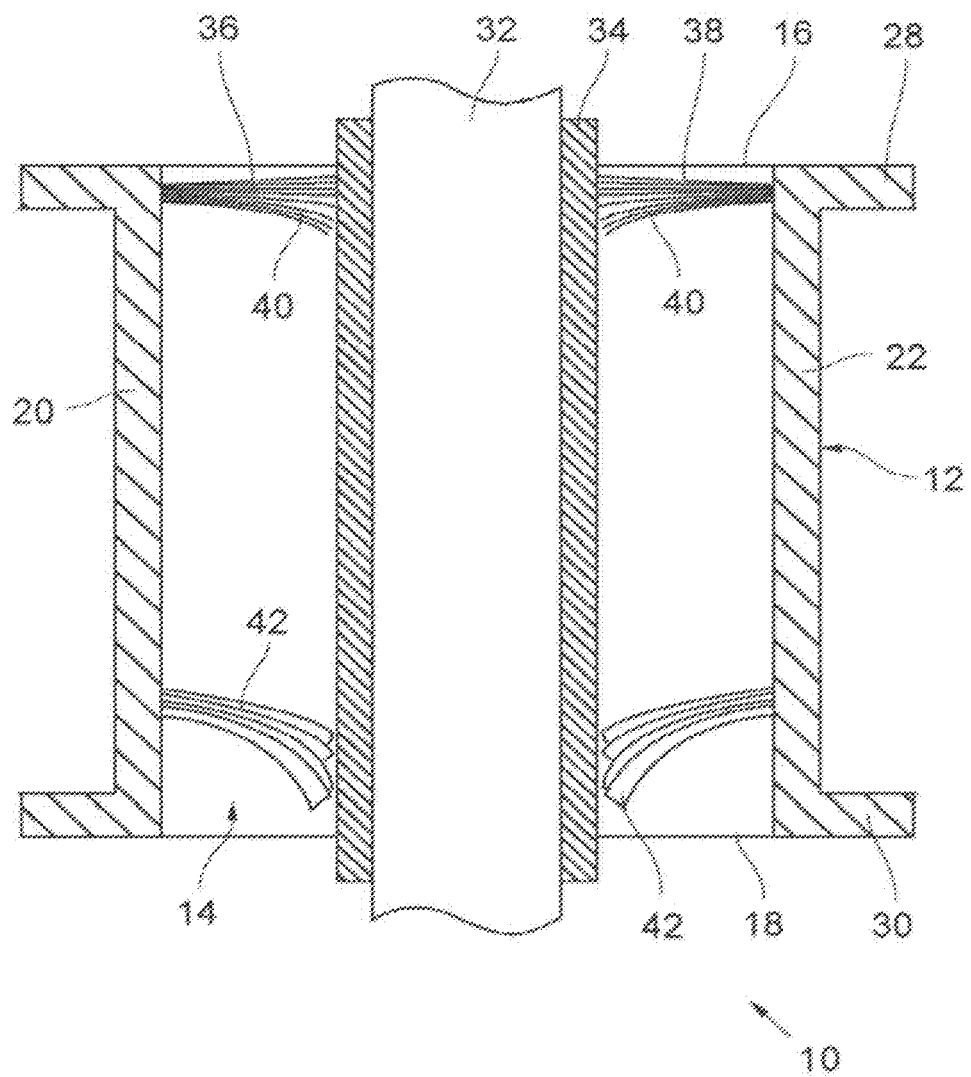
FIG. 1 is a cross sectional view of an embodiment of the inventive device for passing pipes or cables through as opening in a building.
Figure 2:
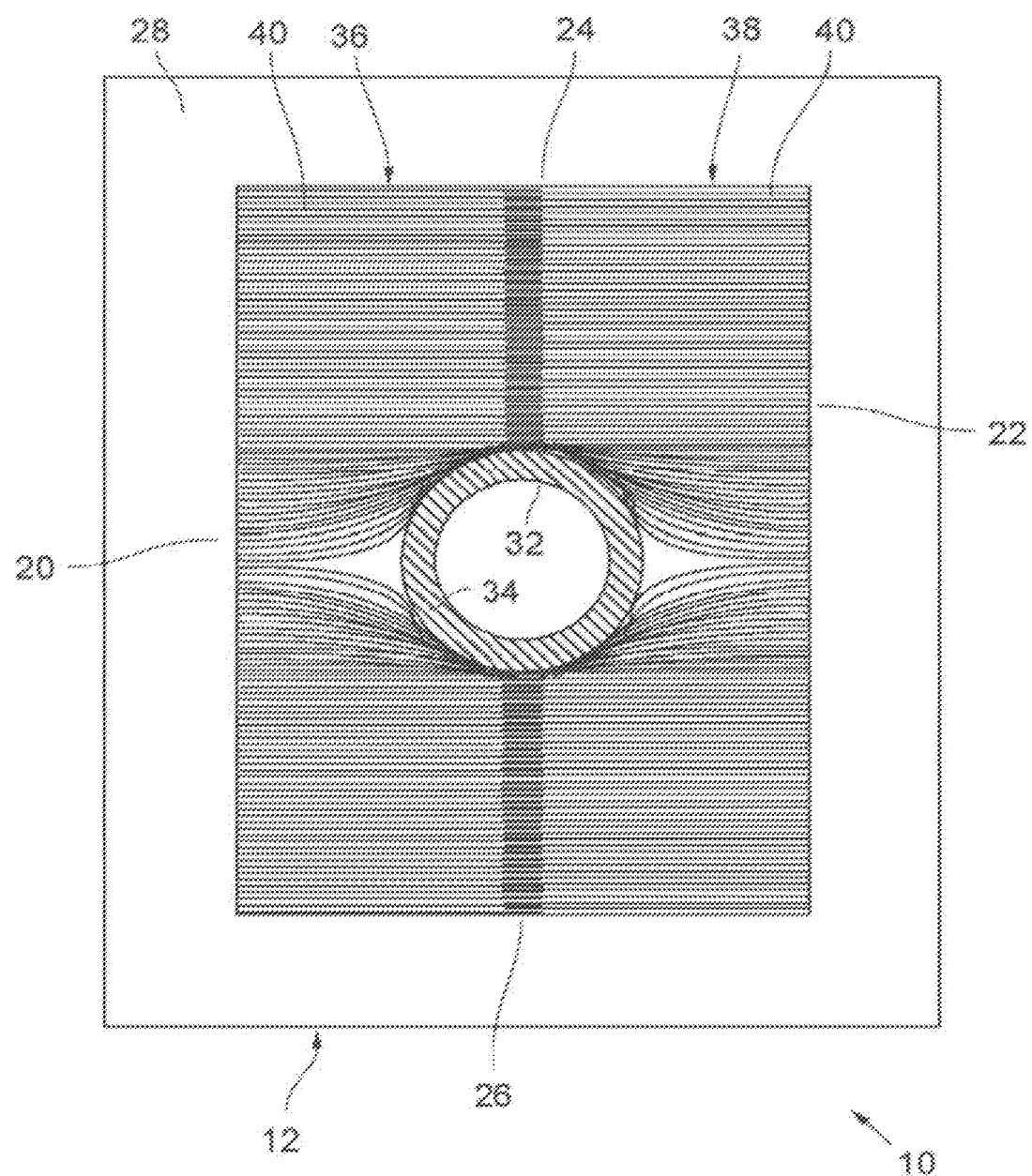
FIG. 2 is a plan view of the device shown in FIG. 1.

The device 10 that is shown in FIG. 1 and that is intended for passing pipes or cables through an opening in a building comprises a sleeve-like housing 12, which is designed more or less like a box and, as a result, has a rectangular cross section, which is much better illustrated in the plan view in FIG. 2. In the center of the housing 12 there is an axial passage channel 14, which is open at its upper end 16 and its lower end 18 and is defined by the four vertical walls 20, 22, 24, 26 of the housing. In this embodiment and throughout the entire specification as well as in the claims the terms "upper" and "lower" as well as the terms "horizontal" and "vertical" refer to the illustrated installation position of the device 12 in a ceiling of a building that is not depicted in greater detail. However, this manner of installation is not to be considered as limiting the present invention. Instead, it is also conceivable to incorporate a corresponding device in an opening in a wall, so that the housing 12 is tilted to one side in relation to the position, shown in FIG. 1; and the passage channel 14 runs horizontally.

At its upper end, the housing 12 has a radially outwards extending flange 28 that completely surrounds the upper opening 16. A corresponding radial flange 30 is also provided at the lower end of the housing 12. In the installation position shown in FIG. 1, the circumferential flanges 28, 30 are provided to terminate flush with the corresponding surfaces on the top side and the bottom side of the ceiling of a building, into which the device 10 is inserted. The device 10 is installed by casting the housing 12 with the concrete during the construction of the ceiling.

Inside the housing 12 there is a vertical pipe 32, which is surrounded with a sheath 34 made of an insulating material. This pipe 32 is shown merely for illustrative purposes as an example of a pipe or cable that is to be passed through the opening in the ceiling. As can be clearly seen in FIGS. 1 and 2, the pipe 32 has a much smaller cross section than the free opening cross section of the axial passage channel 14 so that the pipe 32 can be moved laterally during its installation therein.

At the upper end of the passage channel 14, there are two brushes 36, 38 in the upper opening 16 of the passage channel. These two brushes are mounted on the opposite longer walls 20, 22 of the passage channel 14, and the bristles 40 of the brushes extend more or less horizontally towards the center of the passage channel 14. The bristles 40 are flexible, and their length is dimensioned in such a way that they can mesh with each other in the center of the channel in order to close the passage channel 14. This situation is shown next to the pipe 32 in FIG. 2. In the middle of the passage channel 14 where the pipe 32 is inserted into the channel, the bristles 40 deflect laterally, i.e., in the plane of the flange 28, and downwards and nestle, due to their flexibility, against the outer periphery of the insulating sheath 34 of the pipe 32. As a result, the two brushes 36, 38 form a kind of curtain that closes the free cross section of the passage channel 14 in such a way that it appears opaque. In addition, said brushes form a convection barrier. The bristles 40 may be made of any suitable material, for example, an organic fibrous material or also an inorganic fibrous material. The bristles 40 are provided along the respective brush 36, 38 horizontally next to one another over the entire width of the corresponding wall 20, 22.

Prior to the insertion of the pipe 32, the two brushes 36, 38, which mesh with one another, completely close the free cross section of the passage channel 14. If the pipe 32 passes through the upper opening 16, for example, from above, then the bristles 40 endeavor to move, in the manner described above, laterally and downwards away from each other and release the cross section that is only large enough for the insertion of the pipe 32.

Furthermore, the illustrated embodiment of the device 10 according to the invention comprises flexible strips 42 of material that are mounted on the same walls 20, 22 of the housing on a level below the brushes 36, 38. Each of the strips 42 is attached with one of its ends to one of the walls 20, 22, while its free end protrudes into the passage channel 14. In this case the strip 42 can sag slightly downwards, but should have sufficient stiffness to ensure that the strips 42 of the opposite walls 20, 22 touch each other or at least come very close to each other approximately in the middle of the passage channel 14. The strips 42 rest laterally against the inserted pipe 32. In each case, a series of strips 42 extend over the entire width of the respective wall 20, 22 beneath a brush 36, 38.

The strips 42 are made of a non-flammable fabric, in particular, a woven glass fiber fabric, as a base material and are coated with an intumescent material, which expands subject to exposure to heat and forms a fireproof, rigid body. In the present case, the intumescent coating material foams on the flexible strip 42 of woven fabric in the event of a fire, so that the intumescent material completely seals the remaining free space between the outer periphery of the pipe 32 and the walls 20, 22, 24, 26 of the housing 12. In this way, a fire barrier is formed that prevents a fire from leaping over and beyond the ceiling into the respective adjoining space. Furthermore, this approach provides a thermal insolation between the spaces.

The block of foamed intumescent material, which is generated in the event of a fire, is held in the passage channel 14 by means of the glass fiber reinforcement of the flexible strips 42 of woven fabric and is prevented from falling out of the opening. Even ash can no longer fall out through the passage channel 14.

Furthermore, the brushes 36, 38 with their bristles 40 are used as a base for a self-levelling silicone sealant that is distributed among the brushes in the upper opening 16 at the upper end of the device 10. This measure allows the passage channel 14 to be sealed off against the ingress of water.

The device 10 that is depicted is easy to install and allows for a good positioning of the pipe or cable, which is to be passed through, inside the passage channel 14 because the flexible bristles 40 of the brushes 36, 38 and the flexible strips 42 of woven fabric conform readily to the outer surface of the pipe or cable and reliably close the remaining free opening cross section.

What is claimed is:

1. A device, comprising:
    a housing comprising a channel with a first end and a second end;
    a curtain adjacent to the first end to at least partially enclose the channel in an uninstalled state; and
    a fire-retardant material extending into the channel at a location between the first end and the second end, wherein the curtain moves within the channel in an installed state, the curtain moving to accommodate passage of an object through the channel, the object to enter the channel at the first end and to exit the channel at the second end, and wherein the fire-retardant material curves in an axial direction within the channel and at least partially surrounds the object in the channel in the installed state, the housing coupled to an opening in a barrier.

2. The device of claim 1, wherein:
    the housing has an upper surface and a lower surface, and
    the curtain is coupled between the upper surface and the lower surface of the housing and extends at least partially into the channel.

3. The device of claim 1, wherein the curtain includes one or more portions that move in the installed state to accommodate passage of the object through the channel.

4. The device of claim 3, wherein:
    the curtain includes a plurality of said portions; and
    the plurality of said portions have substantially a same length.

5. The device of claim 3, wherein the curtain moves and the fire-retardant material deflects to allow passage of the object through the channel in the installed state.

6. The device of claim 1, wherein the fire-retardant material comprises in the installed state:
    a first curved portion extending from a first surface of the housing;
    a second curved portion extending from a second surface of the housing; and
    the first surface is in opposing relation to the second surface.

7. The device of claim 1, wherein the fire-retardant material comprises an intumescent material.

8. The device of claim 7, wherein the intumescent material is configured to expand and block the channel under heat.

9. The device of claim 1, wherein:
    the object is a pipe or cable; and
    the barrier is a wall or ceiling of a building.

10. The device of claim 1, wherein the housing has a rectangular shape.

11. The device of claim 1, wherein the curtain extends from at least one surface of the housing.

12. The device of claim 1, wherein the curtain includes a plurality of portions extending toward a central axis of the channel and wherein each of the plurality of portions is flexible to move in at least two directions.

13. The device of claim 1, wherein the fire-retardant material extends in a direction toward the channel and deflects to accommodate the object in the installed state.

* * * * *

UNITED STATES PATENT AND TRADEMARK OFFICE
CERTIFICATE OF CORRECTION

PATENT NO. : 11,585,466 B2   Page 1 of 2
APPLICATION NO. : 17/568082
DATED : February 21, 2023
INVENTOR(S) : Mario Paetow, Christian Förg and Rudolf Semler It is certified that error appears in the above-identified patent and that said Letters Patent is hereby corrected as shown below:

On the Title Page

Column 2, AU B-30326/95 in Item (56) FOREIGN PATENT DOCUMENTS currently reads, "30326/95" and should read --B-30326/95--;

(Pg. 2), Column 1, U.S. 8,910,949 in Item (56) U.S. PATENT DOCUMENTS currently reads, "ÅKesson" and should read --Åkesson--;

(Pg. 2), Column 2, GB 2457152 in Item (56) FOREIGN PATENT DOCUMENTS currently reads, "9/2009" and should read --8/2009--;

(Pg. 2), Column 2, Lines 3-4 in Item (56) OTHER PUBLICATIONS currently reads, "2014] the whole document. 1 pg." and should read --2014] the whole document, 1 pg.--;

(Pg. 2), Column 2, Line 8 in Item (56) OTHER PUBLICATIONS currently reads, "Parent" and should read --Patent--;

(Pg. 3), Column 1, Line 5 in Item (56) OTHER PUBLICATIONS currently reads, "Infringe"" and should read --Infringement"--;

(Pg. 3), Column 1, Line 17 in Item (56) OTHER PUBLICATIONS currently reads, "CFFC" and should read --CFC--;

(Pg. 3), Column 1, Line 21 in Item (56) OTHER PUBLICATIONS currently reads, "District Delaware" and should read --District of Delaware--;

(Pg. 3), Column 1, Line 59 in Item (56) OTHER PUBLICATIONS currently reads, "CFCC" and should read --CFC--;

(Pg. 3), Column 2, Line 38 in Item (56) OTHER PUBLICATIONS currently reads, "Infringe" and Signed and Sealed this
Sixth Day of June, 2023

Katherine Kelly Vidal
*Director of the United States Patent and Trademark Office*

CERTIFICATE OF CORRECTION (continued)
U.S. Pat. No. 11,585,466 B2 should read --Infringement--;

(Pg. 3), Column 2, Line 47 in Item (56) OTHER PUBLICATIONS currently reads, "Countercliams"" and should read --Counterclaims"--;

(Pg. 3), Column 2, Line 52 in Item (56) OTHER PUBLICATIONS currently reads, "District for" and should read --District Court for--;

(Pg. 3), Column 2, Line 68 in Item (56) OTHER PUBLICATIONS currently reads, "court" and should read --Court--;

(Pg. 4), Column 1, Line 10 in Item (56) OTHER PUBLICATIONS currently reads, "Asnwer" and should read --Answer--;

(Pg. 4), Column 1, Lines 14-15 in Item (56) OTHER PUBLICATIONS currently reads, "Infringemnet" and should read --Infringement--;

(Pg. 4), Column 1, Line 52 in Item (56) OTHER PUBLICATIONS currently reads, "District for" and should read --District Court for--;

(Pg. 4), Column 2, Line 6 in Item (56) OTHER PUBLICATIONS currently reads, "COmplaint" and should read --Complaint--;

(Pg. 4), Column 2, Line 9 in Item (56) OTHER PUBLICATIONS currently reads, "field" and should read --filed--; and (Pg. 4), Column 2, Line 12 in Item (56) OTHER PUBLICATIONS currently reads, "District for" and should read --District Court for--.